June 9, 1931.  F. MATOUSHEK  1,808,855
CORN HARVESTER
Filed April 30, 1930   4 Sheets-Sheet 1

Inventor
F. Matoushek,
By Lacey & Lacey,
Attorneys

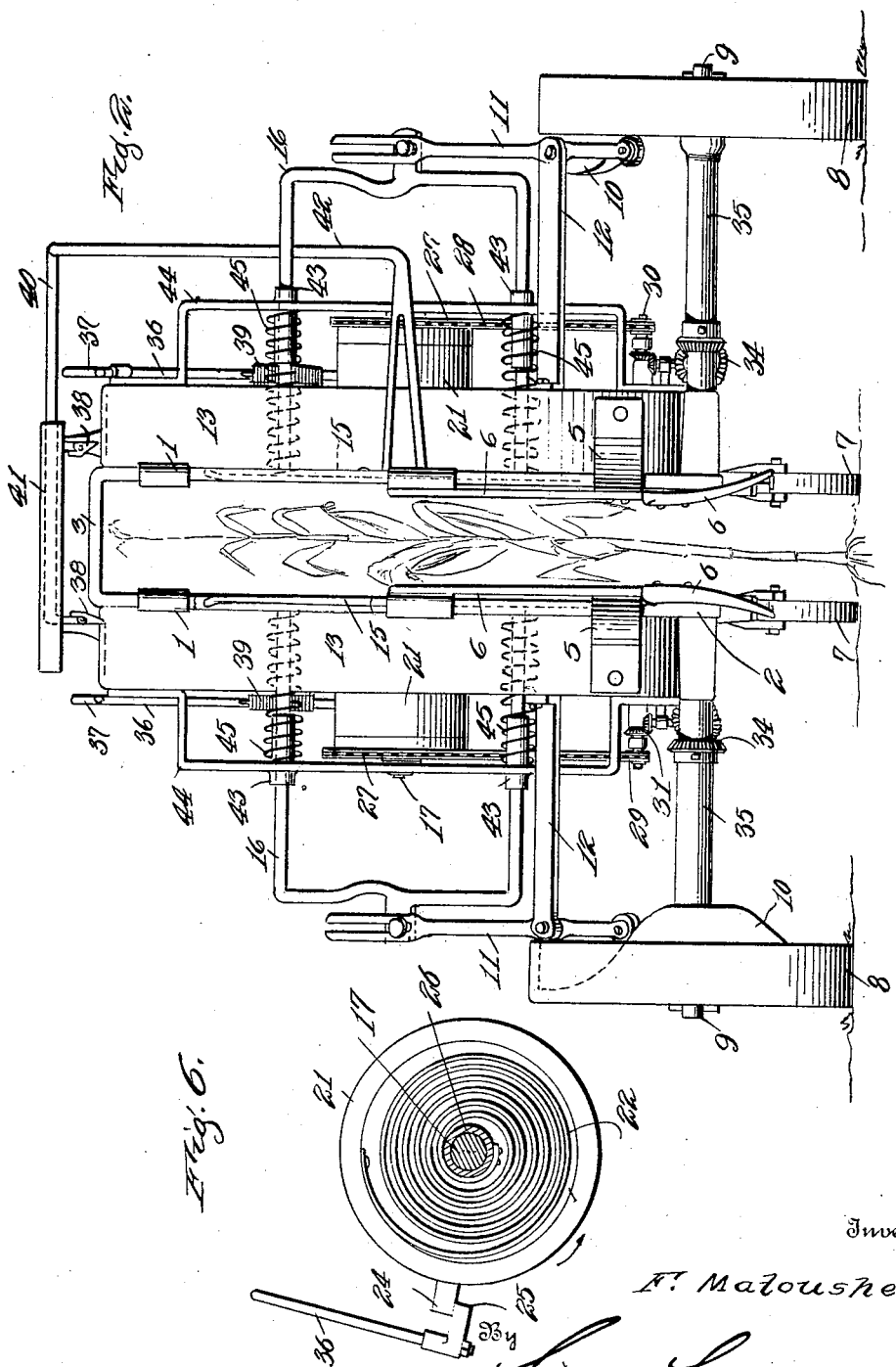

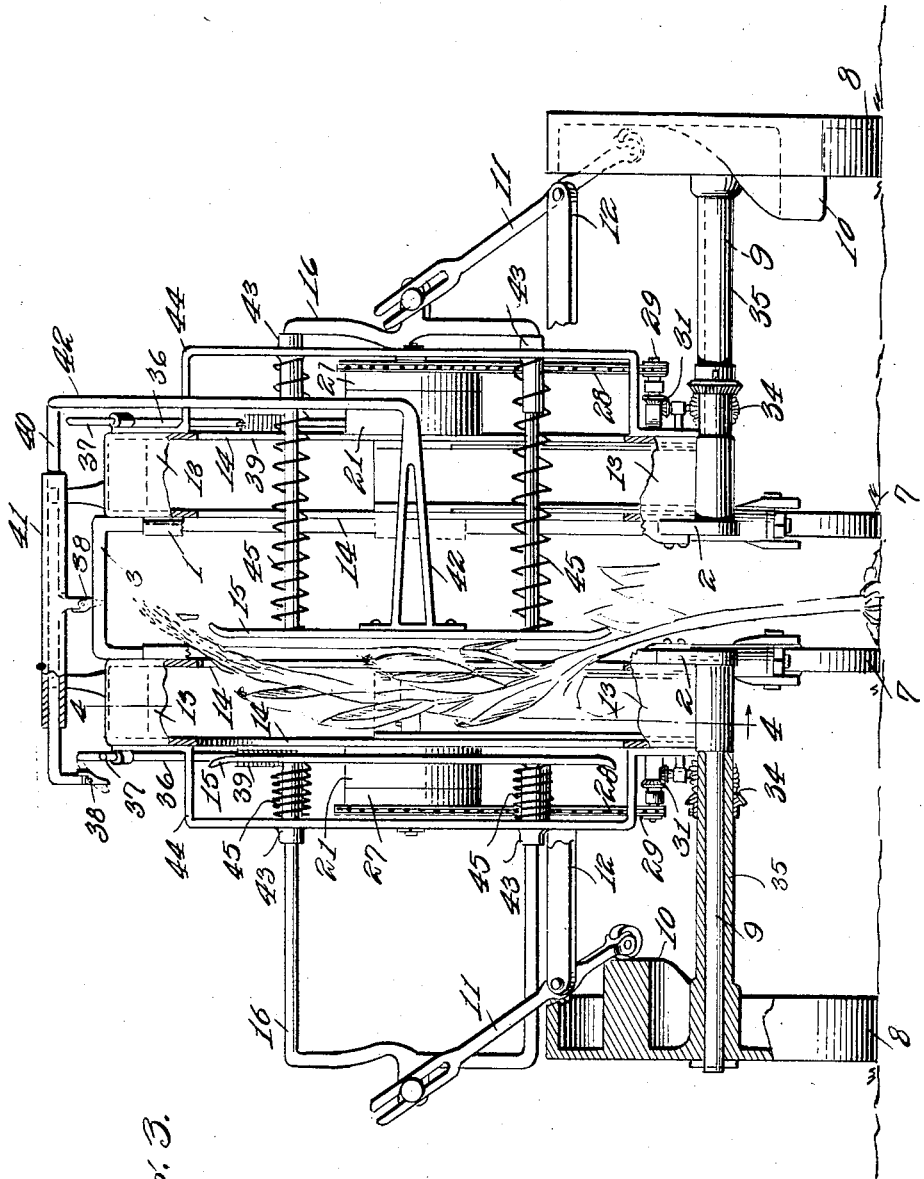

June 9, 1931. F. MATOUSHEK 1,808,855
CORN HARVESTER
Filed April 30, 1930 4 Sheets-Sheet 4
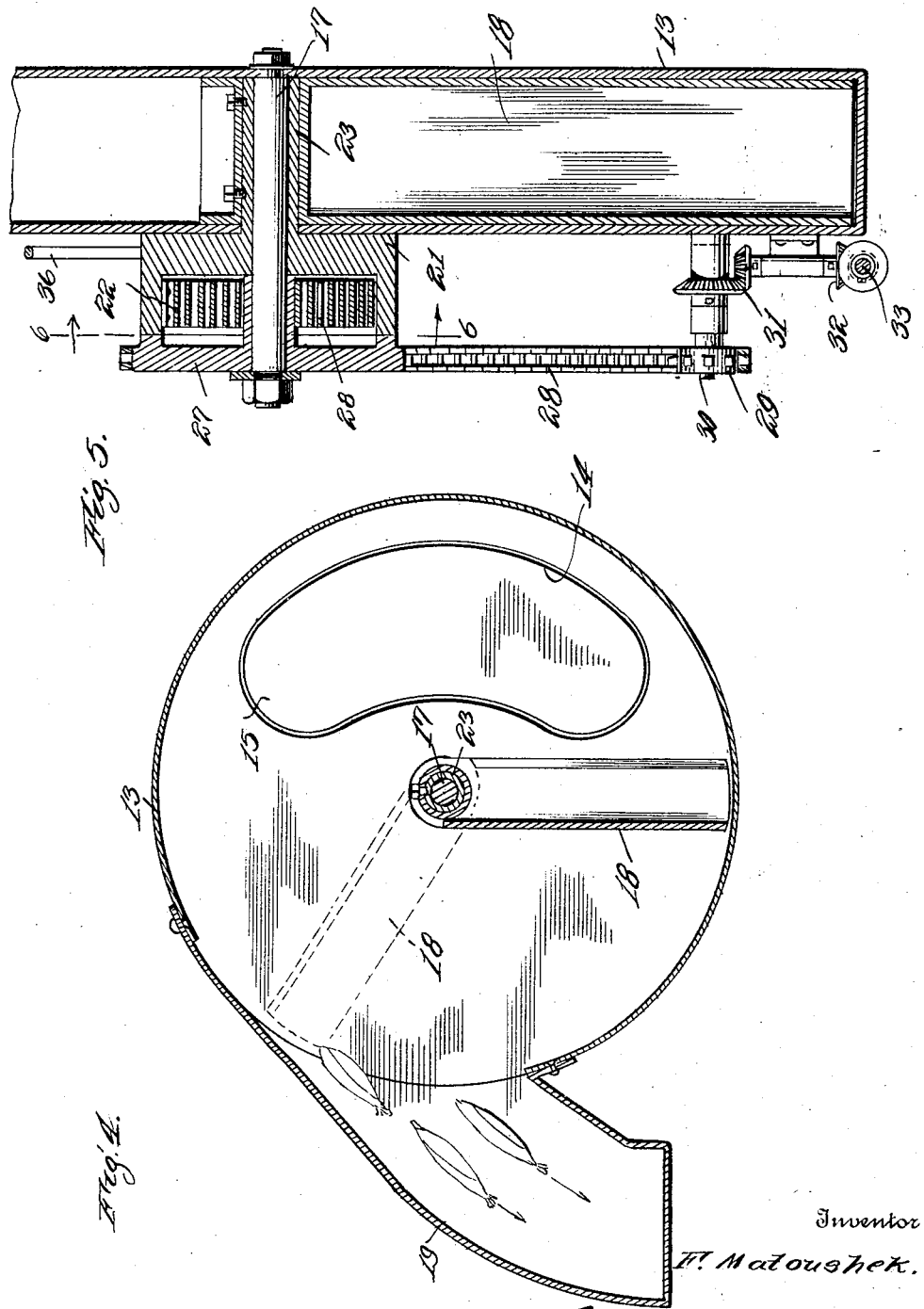

Patented June 9, 1931

1,808,855

UNITED STATES PATENT OFFICE

FRANK MATOUSHEK, OF COLOME, SOUTH DAKOTA

CORN HARVESTER

Application filed April 30, 1930. Serial No. 448,625.

This invention relates to machines for harvesting crops and provides for gathering ears of corn and leaving the stalks standing in the field.

In its organization the machine is constructed to straddle a row of standing corn and embodies a drum or housing at each side. A plunger is associated with each drum and operates to press the stalks into the opposite drum. A knife or like part in the drum detaches the ear or ears from the stalk and delivers it into a box or other suitable receptacle detachably connected with the machine and forming a part thereof. Each side of the machine is similarly constructed and equipped and the coacting parts operate alternately, first upon one side and then upon the opposite side of the machine.

While the drawings illustrate a preferred embodiment of the invention, it is to be understood that in adapting the means to meet specific needs and requirements, the design may be varied and changes in the minor details of construction may be resorted to within the scope of the invention as claimed without departing from the spirit thereof.

For a full understanding of the invention and the merits thereof, reference is to be had to the following description and the drawings hereto attached, in which:

Figure 2 is a vertical transverse sectional view on the line 2—2 of Figure 1, looking toward the rear, as designated by the arrows.

Figure 3 is a front view of the machine, parts being broken away, and showing the upper portion of a corn stalk deflected into one of the side drums by the action of a plunger.

Figure 4 is a detail sectional view of one of the side drums on the line 4—4 of Figure 3.

Figure 5 is an enlarged detail sectional view on the line 5—5 of Figure 1, looking toward the rear, as indicated by the arrows.

Figure 6 is a detail sectional view on the line 6—6 of Figure 5,

Corresponding and like parts are referred to in the following description and designated in the several views of the drawings by like reference characters.

Figure 1:
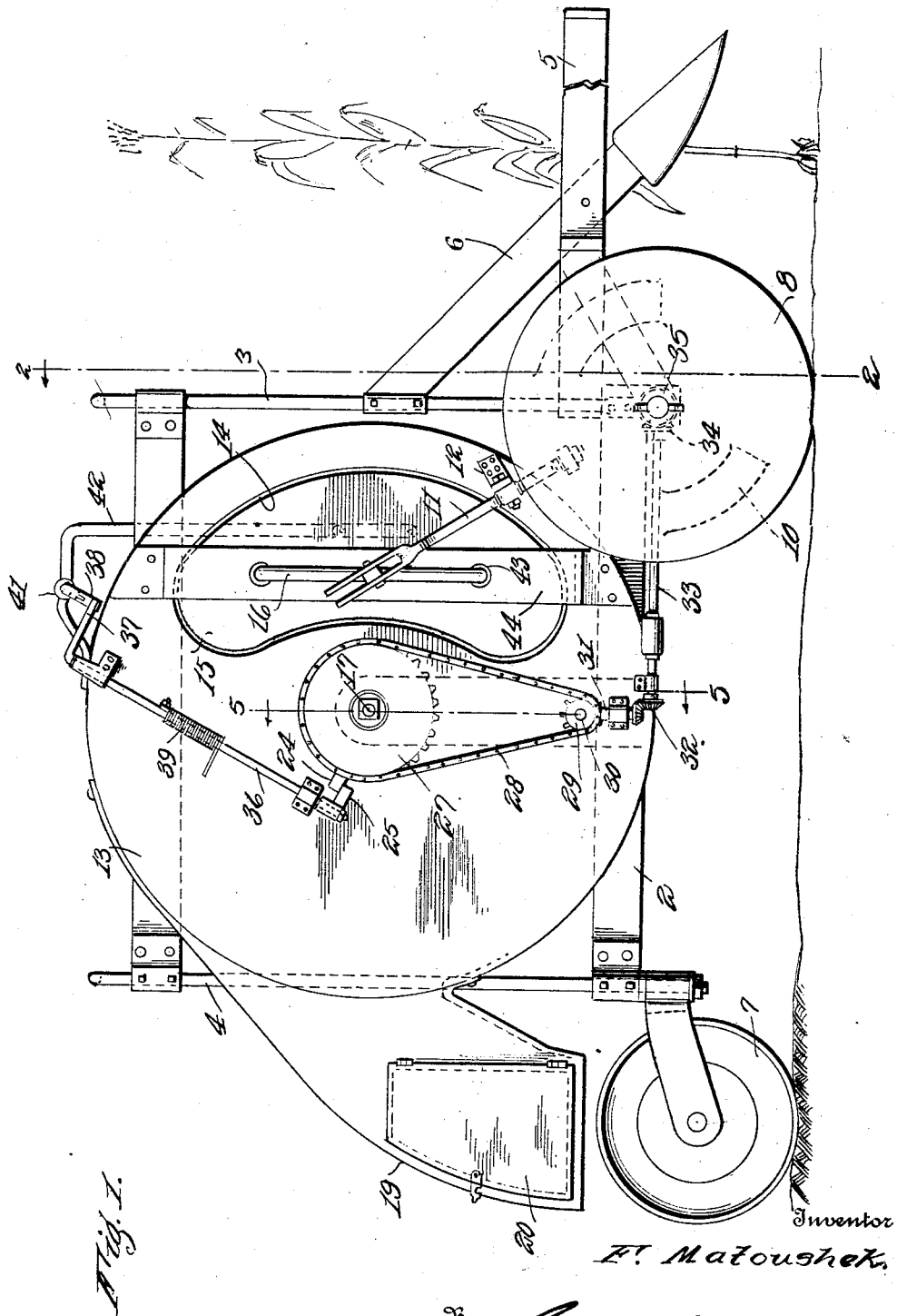
Figure 1 is a side view of a corn harvesting machine illustrative of an embodiment of the invention.

The framework of the machine includes upper bars 1, lower bars 2, a front arch 3, and a rear arch 4. The arches 3 and 4 connect the longitudinal side bars 1 and 2 and are of a height to straddle a row of corn. Spaced guide bars 5 project forwardly from the machine and flare at their front ends to receive and direct the corn stalks to the harvesting mechanism as the machine is drawn or otherwise propelled over the field. Other bars 6 incline forwardly and downwardly and, in practice, lift fallen stalks to insure stripping of the ears of corn therefrom in the operation of the machine. The lifting bars 6 supplement the action of the guide bars 5 and are connected to the latter and to the legs or side members of the front arch 3. Caster heels 7 support the rear portion of the machine and facilitate the guiding thereof and are mounted upon the lower ends of the legs or side members of the rear arch 4. Wheels 8 support the front portion of the machine and are loosely mounted upon transversely spaced axles 9. The wheels 8 also function as drivers for operating the working parts. For convenience, each of the wheels 8 is provided with a cam 10 adapted to operate a lever 11 mounted upon an arm 12 projecting laterally from a side of the machine.

A drum 13 is provided at each side of the machine and constitutes a part of the framework since it is fixed and serves as connecting means between the longitudinal bars 1 and 2. An opening 14 is formed in each side of the drum 13 and extends substantially in a vertical direction and is located forwardly of the axis of the drum. A plunger 15 coacts with each of the drums 13 and operates thereacross through the openings 14 in the side walls thereof. A yoke 16 is attached to each of the plungers 15 and its outer end is engaged by the upper end of the adjacent lever 11 which is forked to coact with a lateral extension at the outer end of the yoke. A fixed shaft 17 is associated with each of the drums 13 and supports an ear stripper 18 rotatably mounted thereon. The stripper 18 is approximately of U-form in cross section and arranged with its hollow side facing forwardly when on the lower side of its orbit to receive the ears of corn when detached from the stalks and deliver them into a receptacle 19 connected with the rear portion of the drum. The receptacle 19 may be of any capacity and is accessible by means of a door 20 to admit of ready removal or discharge of the ears. A barrel 21 is located exterior to each of the drums 13 and is loosely mounted upon the shaft 17 and contains a spiral spring 22 of a gauge to effectively operate the stripper 18. A tubular extension 23 projects inwardly from the barrel 21 and extends across the drum 13 and receives the stripper 18 which is secured thereto. A stop 24 projects outwardly from the barrel 21 and engages a detent 25 whereby the barrel is held during the winding or tensioning of the spring 22. The outer end of the spring 22 is attached to the outer portion of the barrel 21 and its inner end is connected to a tubular extension 26 of a sprocket gear 27 loosely mounted upon the shaft 17. This admits of the spring 22 being wound or tensioned when the sprocket gear 27 is rotated. In practice, the sprocket gear 27 is connected with a ground wheel 8 to be rotated thereby as the machine is drawn or otherwise propelled over the field. The connecting or transmission means may be of any determinate construction and arrangement. As shown, a sprocket chain 28 connects the sprocket wheel 27 with a sprocket gear 29 fast to a shaft 30 which, in turn, is connected by bevel gearing 31 to a shaft which is connected by bevel gearing 32 to a longitudinal shaft 33. Bevel gearing 34 connects the front end of the shaft 33 with a sleeve or tubular extension 35 of the adjacent wheel 8. The several shafts are suitably mounted in any advantageous manner.

The detent 25 is fixed to the lower end of a rod 36 which is mounted upon the outer side of the drum 13. An arm 37 extends forwardly from the upper end of each of the rods 36 and projects into the path of a trip 38. A spring 39 is associated with each of the rods 36 to maintain it in normal position with the detent 25 in the path of the stop 24. The trips 38 are pivoted to depending extensions of a rod 40 which is slidable in a transversely disposed guide 41 slotted in its bottom side to provide clearance for the depending extensions to which the trips 38 are pivoted. A trip 38 is provided for each arm 37. A bracket arm 42 is connected with one of the plungers 15 to move laterally therewith and the rod 40 forms a part thereof or is connected thereto for movement therewith. As the bracket arm 42 moves back and forth across the machine with the plunger 15 to which it is attached, the rods 36 are alternately actuated or rocked by engagement of the trips 38 with the arms 37. This effects a release of the detent mechanism and permits rotation of the ear strippers. The pivoted trips 38 maintain a normal position in their outward movement and engage the arms 37 and rock the parts 36. The trips 38 pivot upon their inward movement so as to clear the arms 37, as will be readily appreciated.

The yokes 16 constitute plunger stems and operate in guides 43 carried by vertically disposed bars 44 attached at their ends to upper and lower portions of the outer side walls of the drums 13. Expansible helical springs 45 are mounted upon the members comprising the yokes 16 and are disposed between the plungers 15 and the bars 44 and normally tend to urge the plungers inwardly across the row of standing corn. The plungers 15 are moved outwardly by the action of the cams 10 upon the lower ends of the levers 11. On reference to Figure 3 of the drawings, it will be observed that the left hand plunger 15 has been moved outwardly to the limit of its movement by the coacting cam 10 whereas the right hand plunger 15 has been moved inwardly by the coacting spring 45 to deflect the upper portion of a corn stalk into the left hand drum 13 to be acted upon by the stripper associated with the drum. A moment after this operation, the left hand detent mechanism is tripped, thereby releasing the stripper which rotates in a counter-clockwise direction, as indicated most clearly in Figure 4 of the drawings, thereby detaching the ears of corn from the stalks and causing the same to enter the receptacle 19, as indicated by the dotted lines in said Figure 4. The stripper is arrested in its rotation by the stop 24 engaging the detent 25, thereby holding the barrel 21 stationary during the rewinding or tensioning of the spring 22. Immediately after operation of the left hand mechanism, the right hand plunger 15 is returned to normal position by the action of the cam 10 on the right hand lever 11. This operation results in compressing the springs 45 and as soon as the right hand plunger 15 clears the right hand drum 13 and assumes a position opposite the opening 14 in the outer wall thereof, the left hand plunger 15 is released by the lever 11 clearing the cam 10, whereupon the spring 45 associated with the left hand plunger expands and rapidly moves the plunger across the row of corn and deflects a stalk into the right hand drum and at this instant, the stripper associated with the said drum is released and detaches the ears from the stalk and delivers them to the receptacle 19. The right and left hand mechanism, operate alternately and in rapid succession, thereby insuring a gathering of the harvest and precluding the missing of any stalks of the row.

What is claimed is:

1. In a corn harvester for detaching the ears from the standing stalks, an ear stripper, and a plunger for deflecting the stalks laterally into the path of the ear stripper.

2. In a corn harvester for detaching the ears from the standing stalks, a rotary ear stripper, and a laterally movable plunger for deflecting the stalks to bring the ears thereof into the path of the rotary stripper.

3. In a corn harvester for detaching the ears from the standing stalks, a rotary ear stripper, means for imparting an intermittent rotary movement to the stripper, a plunger, and means for imparting a movement to the plunger during the inactive periods of the stripper.

4. In a corn harvester for detaching the ears from the standing stalks, an ear stripper at one side of the machine, and a plunger at the opposite side of the machine to move across a row of stalks and deflect them into the path of the stripper.

5. In a corn harvester for detaching the ears from the standing stalks, a rotary ear stripper, an operating spring therefor, means for tensioning the operating spring, detent means for holding the stripper during the tensioning of the spring, and means for releasing the stripper.

6. In a corn harvester for detaching the ears of corn from the standing stalks, a stationary drum, a rotary ear stripper within the drum, and a plunger operable across the row of stalks to deflect the stalks into the drum and across the path of the stripper.

7. In a corn harvester for detaching the ears from the standing stalks, a stationary drum, at one side of the machine, a rotary ear stripper therein, and a plunger at the opposite side of the machine and operable across the row of stalks to deflect the stalks into the drum and across the path of the stripper.

8. In a corn harvester of the character specified, a spring actuated rotary stripper, a detent mechanism for holding the stripper inactive, a spring actuated plunger for deflecting the stalks of a row into the path of the stripper, means for tensioning the spring means associated with the plunger and releasing the latter to permit of a quick action of the spring means to operate the plunger, and means for tripping the detent mechanism to permit of operation of the stripper immediately after the action of the plunger.

9. A corner harvester of the character set forth comprising a rotary ear stripper at each side of the machine, an operating spring for each stripper, means for tensioning the operating springs, a detent mechanism for each of the strippers, a plunger at each side of the machine operable across the row of corn stalks, spring actuated means for operating the plungers in alternation, and means for tripping the rotary strippers alternately in reverse order to the operation of the strippers.

10. A corn harvester of the character specified comprising a drum, a rotary ear stripper therein, and a receptacle associated with the drum to receive the ears of corn as they are detached from the stalks.

11. A corn harvester of the character specified comprising a drum having a side opening, means for deflecting the stalks of a row of corn into the drum through the side opening thereof, a rotary stripper within the drum to detach the ears from the stalks, and a receptacle associated with the drum to receive the ears from the stripper.

In testimony whereof I affix my signature.

FRANK MATOUSHEK. [L. S.]